United States Patent
Wei et al.

(10) Patent No.: US 7,667,428 B2
(45) Date of Patent: Feb. 23, 2010

(54) FAN SYSTEM AND POWER MONITORING APPARATUS THEREOF

(75) Inventors: Chia-Pin Wei, Taoyuan Hsien (TW);
Yi-Lun Chen, Taoyuan Hsien (TW);
Wei-Shuo Tseng, Taoyuan Hsien (TW);
Wen-Shi Huang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 300 days.

(21) Appl. No.: 11/724,192

(22) Filed: Mar. 15, 2007

(65) Prior Publication Data
US 2007/0285859 A1 Dec. 13, 2007

(30) Foreign Application Priority Data
Apr. 7, 2006 (TW) .............................. 95112285 A

(51) Int. Cl.
*H02P 25/00* (2006.01)
(52) U.S. Cl. .................. 318/809; 318/599; 318/811; 318/59
(58) Field of Classification Search ................. 318/809, 318/400.01, 811, 599
See application file for complete search history.

(56) References Cited

U.S. PATENT DOCUMENTS

| 5,777,897 A * | 7/1998 | Giorgio ....................... 700/299 |
| 6,368,064 B1 * | 4/2002 | Bendikas et al. ............... 417/2 |
| 2005/0007041 A1 * | 1/2005 | Liu ............................. 318/77 |

* cited by examiner

*Primary Examiner*—Walter Benson
*Assistant Examiner*—Renata McCloud
(74) *Attorney, Agent, or Firm*—Birch, Stewart, Kolasch & Birch, LLP

(57) ABSTRACT

A power monitoring apparatus for receiving an external input signal includes a first modulating unit, a second modulating unit and a comparing unit. The first modulating unit receives and modulates an input signal into a first signal. The second modulating unit receives and modulates the input signal into a second signal. The comparing unit is electrically connected with the first modulating unit and the second modulating unit and has a first input terminal, a second input terminal and an output terminal. The first input terminal receives the first signal and the second input terminal receives the second signal. When a difference between the first signal and the second signal is higher or lower than a predetermined range, the output terminal outputs a control signal.

17 Claims, 4 Drawing Sheets

FAN SYSTEM AND POWER MONITORING APPARATUS THEREOF

DETAILED DESCRIPTION OF THE INVENTION

Cross Reference to Related Applications

This Non-provisional application claims priority under 35 U.S.C. §119(a) on Patent Application No(s). 095112285 filed in Taiwan, Republic of China on Apr. 7, 2006, the entire contents of which are hereby incorporated by reference.

BACKGROUND OF THE INVENTION

1. Field of Invention

The invention relates to a fan system and a power monitoring apparatus thereof, and in particular to a fan system and a power monitoring apparatus thereof capable of preventing an instantaneous voltage or current variation from influencing a fan assembly.

2. Related Art

The desired functionality of electronic apparatuses is getting ever broader and more powerful, and the array of various accessory apparatuses is also increasing. Therefore, as circuits become increasing and more complicated, the power management device has become an indispensable element of electronic apparatuses, for preventing trace short-circuits from damaging expensive equipments. Fans, fan modules and motors are included in this trend.

When a fan or motor operates, the circuit of the fan or the motor can be impacted by an instantaneous current or voltage that causes the current or voltage to shut down and damages the circuit or the motor of the fan. Also, over-heating can occur because the fan stops operating while the electronic apparatus normally cooled by the fan continues to operate. In order to solve the above-mentioned problems, an over-voltage apparatus or an over-current monitoring apparatus is usually used in a fan to protect the electronic apparatus or the fan from being influenced by instantaneous over-current or instantaneous over-voltage events.

As shown in FIG. 1, a conventional over-voltage apparatus 1 is electrically connected with a motor M of a fan and includes two resistors R and R' and a processor 11 electrically connected with the resistors R and R', and a default voltage is set. The over-voltage apparatus 1 operates as follows. An external voltage signal $V_{in}$ is divided by the resistors R and R' to generate a voltage divided signal $V_s$, which is transferred to the processor 11. The processor 11 compares the voltage divided signal $V_s$ with the default voltage. When the voltage divided signal $V_s$ is higher than the default voltage, the processor 11 outputs a control signal $S_c$ to the motor M so as to decrease the rotating speed of the motor M.

As shown in FIG. 2, a conventional over-current apparatus 2, electrically connected with a motor M of a fan, includes a sensing resistor $R_s$ and a controller 21. The controller 21 is electrically connected with the sensing resistor $R_s$ and sets a default current. The over-current apparatus 2 operates as follows. The sensing resistor $R_s$ senses an external voltage signal $V_{in}$ to generate a current signal $I_s$, which is transferred to the controller 21. The controller 21 compares the current signal $I_s$ with the default current. When the current signal $I_s$ is greater than the default current, the controller 21 outputs a control signal $S_c$ to the motor M so as to reduce the rotating speed of the motor M.

However, the fan using the over-voltage apparatus 1 only can detect an over-voltage condition but cannot immediately detect an instantaneous voltage variation and thus cannot effectively protect the fan. On the other hand, due to the slow response speed of detection, the fan using the over-current apparatus 2 cannot instantaneously suppress the inrush current, which is generated because the voltage changes, and thus the fan assembly tends to be damaged easily. Therefore, neither the over-voltage apparatus 1 nor the over-current apparatus 2 can immediately detect the instantaneous current or voltage variation, and thus both of them cannot effectively protect the fan. This may ultimately shorten the lifetime of the fan.

Consequently, it is an important subject of the invention to provide a fan system capable of immediately detecting instantaneous voltage or current variation and a power monitoring apparatus so as to protect the fan assembly and thus to lengthen the lifetime of the fan system.

SUMMARY OF THE INVENTION

In view of the foregoing, the invention is to provide a fan system and power monitoring apparatus thereof capable of immediately detecting an instantaneous voltage or current variation, thereby protecting the fan assembly and thus lengthening the lifetime of the fan system.

To achieve the above, the invention discloses a power monitoring apparatus, which receives an external input signal and includes a first modulating unit, a second modulating unit and a comparing unit. The first modulating unit receives and modulates the input signal into a first signal. The second modulating unit receives and modulates the input signal into a second signal. The comparing unit is electrically connected with the first modulating unit and the second modulating unit, and has a first input terminal, a second input terminal and an output terminal. The first input terminal receives the first signal, and the second input terminal receives the second signal. When a difference between the first signal and the second signal is higher or lower than a predetermined range, the output terminal outputs a control signal.

To achieve the above, the invention also discloses a fan system for receiving an external input signal. The fan system includes a motor, a power monitoring apparatus and a driving device. The motor receives the input signal. The power monitoring apparatus includes a first modulating unit, a second modulating unit and a comparing unit. The first modulating unit receives and modulates the input signal into a first signal. The second modulating unit receives and modulates the input signal into a second signal. The comparing unit is electrically connected with the first modulating unit and the second modulating unit, and has a first input terminal, a second input terminal and an output terminal. The first input terminal receives the first signal and the second input terminal receives the second signal. When a difference between the first signal and the second signal is higher or lower than a predetermined range, the output terminal outputs a control signal. The driving device, which is electrically connected with the motor and the power monitoring apparatus, receives the control signal and controls a rotating speed of the motor according to the control signal.

As mentioned above, the fan system and the power monitoring apparatus thereof according to the invention both utilize the power monitoring apparatus to monitor the input signal and utilize the first modulating unit, the second modulating unit and the comparing unit in conjunction with one another. Thus, it is possible to compare the predetermined range with the difference between the first signal and the second signal and thus to generate the control signal to be output to the driving device to control the rotating speed of the motor. Compared with the prior art, the invention can monitor the input signal immediately and thus output the control signal immediately so as to decrease the rotating speed of the motor and protect the fan assembly when the instantaneous voltage or current variation occurs. In addition, it is possible to recover the rotating speed of the motor to make the fan system operate normally when the input signal recovers to normal, and thus to lengthen the lifetime of the fan system. In addition, the power monitoring apparatus of the invention has a simple architecture to detect the variation of the voltage or current, so it is highly cost-effective.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
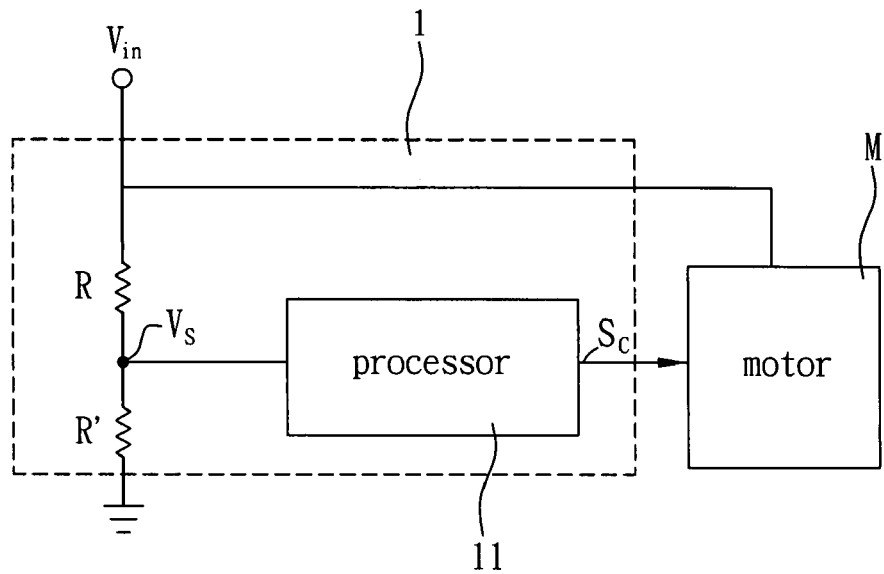
FIG. 1 and FIG. 2 are schematic illustrations showing two conventional over-voltage apparatuses.
Figure 2:
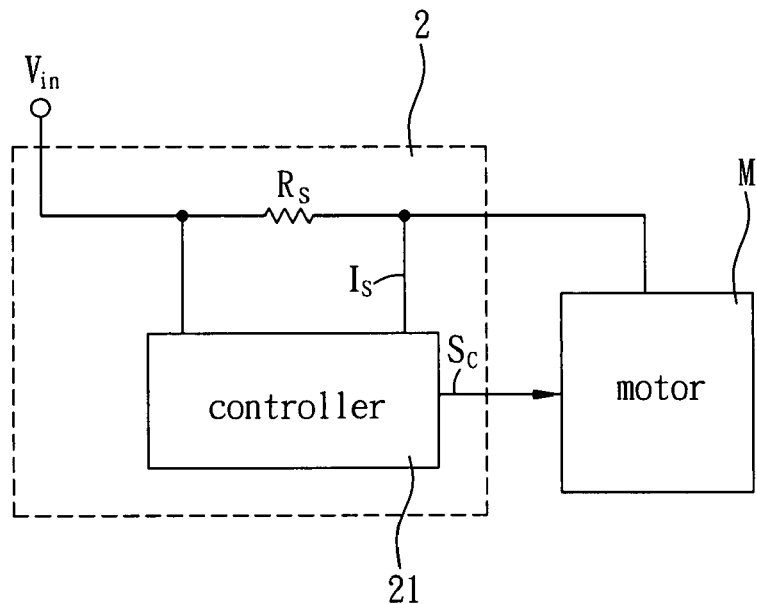
Figure 3:
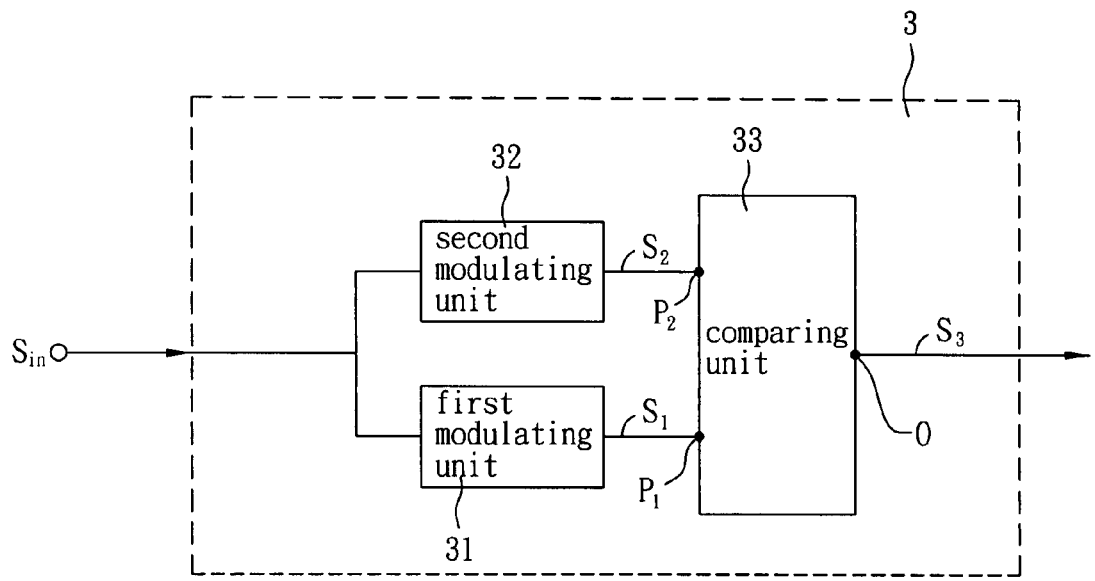
FIGS. 3 and 4 are schematic illustrations showing a power monitoring apparatus according to a preferred embodiment of the invention.

Referring to FIG. 3, a power monitoring apparatus 3 according to a preferred embodiment of the invention receives an external input signal $S_{in}$, and includes a first modulating unit 31, a second modulating unit 32 and a comparing unit 33. The power monitoring apparatus 3 may be applied to a fan system.

In this embodiment, the first modulating unit 31 receives and modulates the input signal $S_{in}$ into a first signal $S_1$, and the second modulating unit 32 receives and modulates the input signal $S_{in}$ into a second signal $S_2$. The first signal $S_1$ and the second signal $S_2$ of this embodiment are not particularly restricted and depend on the voltage or current to be monitored by the power monitoring apparatus 3. Thus, the first signal $S_1$ and the second signal $S_2$ are both voltage signals when the power monitoring apparatus 3 is monitoring the voltage; and the first signal $S_1$ and the second signal $S_2$ are both current signals when the power monitoring apparatus 3 is monitoring the current.

As shown in FIG. 3, the comparing unit 33 is electrically connected with the first modulating unit 31 and the second modulating unit 32 and has a first input terminal $P_1$, a second input terminal $P_2$ and an output terminal O. The first input terminal $P_1$ receives the first signal $S_1$, and the second input terminal $P_2$ receives the second signal $S_2$. When a difference between the first signal $S_1$ and the second signal $S_2$ is higher or lower than a predetermined range, the output terminal O outputs a control signal $S_3$. The comparing unit 33 of this embodiment may be a comparator, and may be implemented by a processor or an OP amplifier (operational amplifier). Illustrations will be made by taking the OP amplifier as an example.

Figure 4:
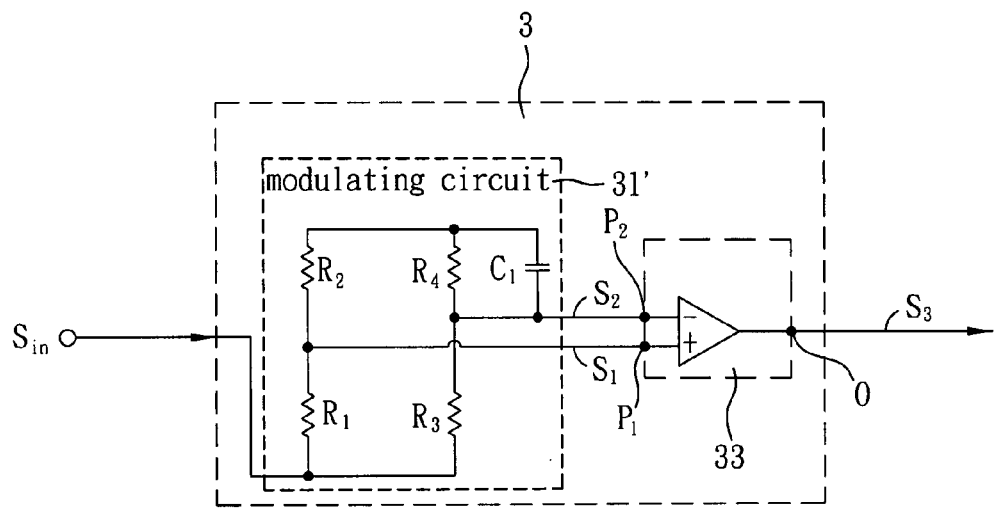

As shown in FIG. 4, the first modulating unit 31 and the second modulating unit 32 of this embodiment may also be constituted by a modulating circuit 31', which is electrically connected with the comparing unit 33.

The modulating circuit 31' includes a first resistor $R_1$, a second resistor $R_2$, a third resistor $R_3$, a fourth resistor $R_4$ and a capacitor $C_1$. A first end of the first resistor $R_1$ receives the input signal $S_{in}$ and a first end of the second resistor $R_2$ is electrically connected with a second end of the first resistor $R_1$ and the first input terminal $P_1$. A first end of the third resistor $R_3$ receives the input signal $S_{in}$, and is electrically connected with the first end of the first resistor $R_1$. A first end of the fourth resistor $R_4$ is electrically connected with a second end of the third resistor $R_3$ and the second input terminal $P_2$. A second end of the fourth resistor $R_4$ is electrically connected with a second end of the second resistor $R_2$. The capacitor $C_1$ has a first end electrically connected with the second input terminal $P_2$ and the first end of the fourth resistor $R_4$, and a second end of the capacitor $C_1$ is electrically connected with the second end of the fourth resistor $R_4$.

The power monitoring apparatus 3 operates as follows. The modulating circuit 31' receives the external input signal $S_{in}$, modulates the input signal $S_{in}$ through the first resistor $R_1$ and the second resistor $R_2$ to generate the first signal $S_1$, which is immediately transferred to the first input terminal $P_1$. The modulating circuit 31' also modulates the input signal $S_{in}$ through the third resistor $R_3$ and the fourth resistor $R_4$, and charges the capacitor $C_1$ to generate the second signal $S_2$, which is immediately transmitted to the second input terminal $P_2$. The comparing unit 33 compares the predetermined range of the comparing unit 33 with the difference between the first signal $S_1$ and the second signal $S_2$ and generates the control signal $S_3$ at the output terminal O when the difference between the first signal $S_1$ and the second signal $S_2$ is higher or lower than the predetermined range. This invention immediately monitors the input signal $S_{in}$. When the input signal $S_{in}$ has an instantaneous voltage or current variation, the first signal $S_1$ also changes instantaneously. However, the charging action of the capacitor $C_1$ makes the second signal $S_2$ vary progressively but have no instantaneous variation. So, the difference between the first signal $S_1$ and the second signal $S_2$ exceeds the predetermined range such that the comparing unit 33 can immediately output the control signal $S_3$ to decrease the rotating speed of the motor M, to protect the fan assembly, and to recover the rotating speed of the motor M when the input signal $S_{in}$ recovers to the normal signal.

Figure 5:
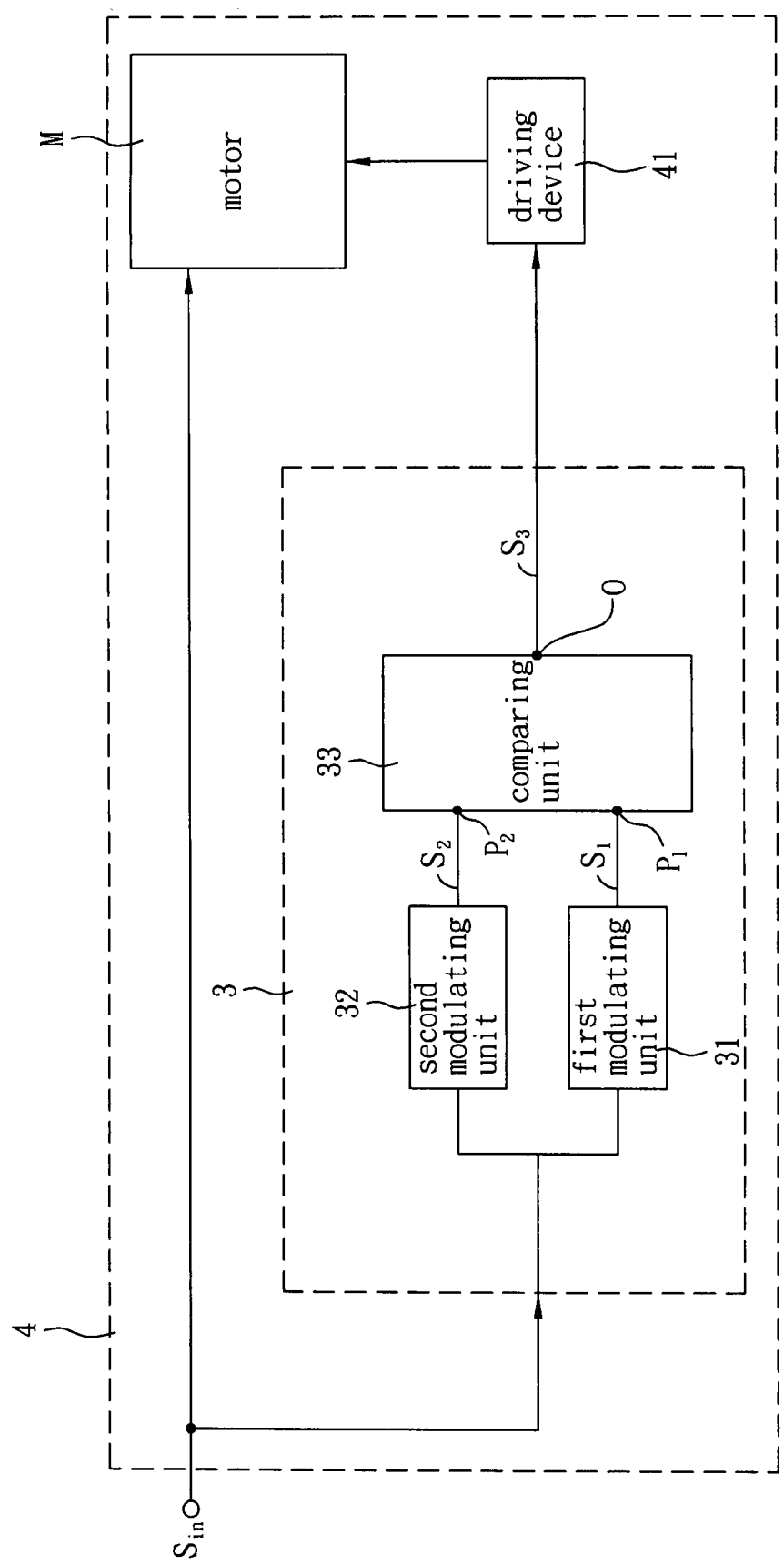
FIGS. 5 and 6 are schematic illustrations showing a fan system according to a preferred embodiment of the invention.

As shown in FIG. 5, a fan system 4 according to the preferred embodiment of the invention receives an external input signal $S_{in}$ and includes a motor M, a power monitoring apparatus 3 and a driving device 41.

In this embodiment, the motor M receives the input signal $S_{in}$, and the driving device 41 is electrically connected with the motor M and the power monitoring apparatus 3. The driving device 41 of this embodiment has a driving circuit (not shown), the constitution of the driving circuit is not particularly restricted, and the driving circuit and the comparing unit 33 may also be integrated in a processor.

The fan system 4 operates as follows. The power monitoring apparatus 3 and the motor M simultaneously receive the input signal $S_{in}$, and the power monitoring apparatus 3 modulates the received input signal $S_{in}$. Then, the comparing unit 33 generates the control signal $S_3$, and transfers the control signal $S_3$ to the driving device 41, thus controlling the rotating speed of the motor M.

Figure 6:
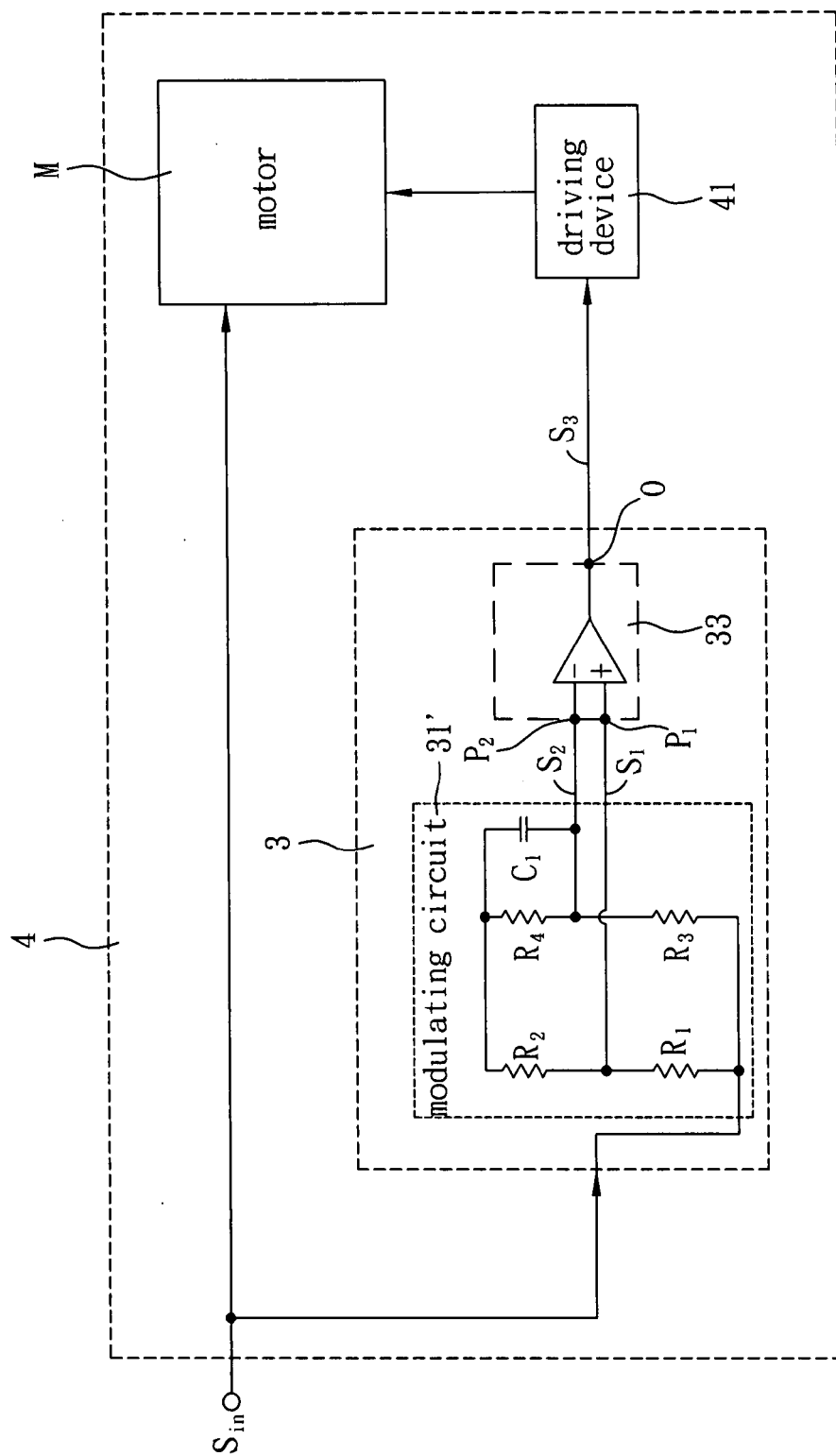

As shown in FIG. 6, the modulating circuit 31' of this embodiment is applied to the fan system 4. Because the constitutions and functions of the power monitoring apparatus 3 and the modulating circuit 31' have been described hereinabove, detailed descriptions thereof will be omitted.

When the input signal $S_{in}$ processed via the power monitoring apparatus 3 varies instantaneously, the fan system 4 can immediately monitor and output the control signal $S_3$. Therefore, the driving device 41 can decrease the rotating speed of the motor M according to the control signal $S_3$ to protect the fan system 4. In addition, when the input signal $S_{in}$ recovers to normal, the control signal $S_3$ recovers the rotating speed of the motor M.

In summary, the fan system and the power monitoring apparatus thereof according to the invention both utilize the power monitoring apparatus to monitor the input signal and utilize the first modulating unit, the second modulating unit and the comparing unit in conjunction with one another. Thus, it is possible to compare the predetermined range with the difference between the first signal and the second signal and thus to generate the control signal to be output to the driving device to control the rotating speed of the motor. Compared with the prior art, the invention can monitor the input signal immediately and thus output the control signal immediately so as to decrease the rotating speed of the motor and protect the fan assembly when the instantaneous voltage or current variation occurs. In addition, it is possible to recover the rotating speed of the motor to make the fan system operate normally when the input signal recovers to normal, and thus to lengthen the lifetime of the fan system. In addition, the power monitoring apparatus of the invention has a simple architecture to detect the variation of the voltage or current, so it is highly cost-effective.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A power monitoring apparatus for receiving an external input signal, the power monitoring apparatus comprising:
    a first modulating unit for receiving the input signal and modulating the input signal into a first signal;
    a second modulating unit for receiving the input signal and modulating the input signal into a second signal; and
    a comparing unit, which is electrically connected with the first modulating unit and the second modulating unit and has a first input terminal for receiving the first signal, a second input terminal for receiving the second signal, and an output terminal for outputting a control signal to decrease a rotation speed of a motor when a difference between the first signal and the second signal is higher or lower than a predetermined range.

2. The power monitoring apparatus according to claim 1, wherein each of the first signal and the second signal is a current signal.

3. The power monitoring apparatus according to claim 1, wherein each of the first signal and the second signal is a voltage signal.

4. The power monitoring apparatus according to claim 1, wherein the comparing unit is a comparator.

5. The power monitoring apparatus according to claim 4, wherein the comparator is a processor or an OP amplifier.

6. The power monitoring apparatus according to claim 1, wherein the first modulating unit and the second modulating unit are constituted by a modulating circuit, and the modulating circuit is electrically connected with the comparing unit.

7. The power monitoring apparatus according to claim 6, wherein the modulating circuit comprises:
    a first resistor having a first end for receiving the input signal;
    a second resistor having a first end electrically connected with a second end of the first resistor and the first input terminal;
    a third resistor having a first end for receiving the input signal and electrically connected with the first end of the first resistor;
    a fourth resistor having a first end electrically connected with a second end of the third resistor and the second input terminal, and a second end electrically connected with a second end of the second resistor, and
    a capacitor having a first end electrically connected with the second input terminal and the first end of the fourth resistor, and a second end electrically connected with the second end of the fourth resistor.

8. The power monitoring apparatus according to claim 1, wherein the power monitoring apparatus is used in a fan system.

9. A fan system for receiving an external input signal, the fan system comprising:
    a motor for receiving the input signal;
    a power monitoring apparatus, which comprises:
        a first modulating unit for receiving the input signal and modulating the input signal into a first signal,
        a second modulating unit for receiving the input signal and modulating the input signal into a second signal, and
        a comparing unit electrically connected with the first modulating unit and the second modulating unit, and having a first input terminal for receiving the first signal, a second input terminal for receiving the second signal, and an output terminal for outputting a control signal to decrease a rotation speed of the motor when a difference between the first signal and the second signal is higher or lower than a predetermined range; and
    a driving device electrically connected with the motor and the power monitoring apparatus for receiving the control signal and controlling a rotating speed of the motor according to the control signal.

10. The fan system according to claim 9, wherein each of the first signal and the second signal is a current signal.

11. The fan system according to claim 9, wherein each of the first signal and the second signal is a voltage signal.

12. The fan system according to claim 9, wherein the comparing unit is a comparator.

13. The fan system according to claim 12, wherein the comparator is a processor or an OP amplifier.

14. The fan system according to claim 9, wherein the first modulating unit and the second modulating unit are constituted by a modulating circuit, and the modulating circuit is electrically connected with the comparing unit.

15. The fan system according to claim 14, wherein the modulating circuit comprises:
    a first resistor having a first end for receiving the input signal;
    a second resistor having a first end electrically connected with a second end of the first resistor and the first input terminal;
    a third resistor having a first end for receiving the input signal and electrically connected with the first end of the first resistor;
    a fourth resistor having a first end electrically connected with a second end of the third resistor and the second input terminal, and a second end electrically connected with a second end of the second resistor; and
    a capacitor having a first end electrically connected with the second input terminal and the first end of the fourth resistor, and a second end electrically connected with the second end of the fourth resistor.

16. The fan system according to claim 9, wherein the driving device has a driving circuit.

17. The fan system according to claim 16, wherein the driving circuit and the comparing unit are integrated in a processor.

* * * * *